United States Patent
Bowker et al.

(10) Patent No.: US 11,708,291 B2
(45) Date of Patent: Jul. 25, 2023

(54) METHODS FOR MODIFYING MULTI-MODE OPTICAL FIBER MANUFACTURING PROCESSES

(71) Applicant: Corning Incorporated, Corning, NY (US)

(72) Inventors: Jennifersue A. Bowker, Hampstead, NC (US); Xin Chen, Corning, NY (US); Jason Edward Hurley, Corning, NY (US); Elios Klemo, Wilmington, NC (US); Igor Rafaelyevich Mejouev, Wilmington, NC (US); Daniel Aloysius Nolan, Corning, NY (US); Dale Robert Powers, Campbell, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/123,732

(22) Filed: Sep. 6, 2018

(65) Prior Publication Data

US 2019/0016624 A1  Jan. 17, 2019

Related U.S. Application Data (63) Continuation of application No. 14/253,994, filed on Apr. 16, 2014, now Pat. No. 10,131,566.
(Continued)

(51) Int. Cl.
  *C03B 37/025* (2006.01)
  *C03B 37/07* (2006.01)
  (Continued)

(52) U.S. Cl.
  CPC ....... *C03B 37/0253* (2013.01); *G01M 11/338* (2013.01); *G02B 6/0288* (2013.01); *C03B 2205/40* (2013.01)

(58) Field of Classification Search
  CPC .................. C03B 37/0253; C03B 2205/40
  See application file for complete search history.

(56) References Cited

U.S. PATENT DOCUMENTS

| 5,073,179 A | 12/1991 | Yoshimura et al. |
| 6,574,403 B1 | 6/2003 | Golowich et al. |
(Continued)

FOREIGN PATENT DOCUMENTS

| EP | 2207022 A1 | 7/2010 |
| JP | 56-043528 A | 4/1981 |
(Continued)

OTHER PUBLICATIONS

Gholami et al., Compensation of Chromatic Dispersion by Modal Dispersion in MMF- and VCSEL-based Gigabit Ethernet Transmissions, IEEE Photonics Technology Letters, vol. 21, No. 10, pp. 645-647, May 15, 2009.
(Continued)

*Primary Examiner* — Erin Snelting
(74) *Attorney, Agent, or Firm* — Kevin L. Bray; Svetlana Z. Short (57) ABSTRACT

Methods for modifying multi-mode optical fiber manufacturing processes are disclosed. In one embodiment, a method for modifying a process for manufacturing multi-mode optical fiber includes measuring at least one characteristic of a multi-mode optical fiber. The at least one characteristic is a modal bandwidth or a differential mode delay at one or more wavelengths. The method further includes determining a measured peak wavelength of the multi-mode optical fiber based on the measured characteristic, determining a difference between the target peak wavelength and the measured peak wavelength, and modifying the process for manufac-
(Continued)

turing multi-mode optical fiber based on the difference between the target peak wavelength and the measured peak wavelength.

15 Claims, 8 Drawing Sheets

Related U.S. Application Data (60) Provisional application No. 61/817,503, filed on Apr. 30, 2013.

(51) Int. Cl.
*G01M 11/00* (2006.01)
*G02B 6/028* (2006.01)

(56) References Cited

U.S. PATENT DOCUMENTS

| | | | |
|---|---|---|---|
| 6,664,801 B1 | 12/2003 | Palusa | |
| 7,926,304 B2 | 4/2011 | Costello, III et al. | |
| 8,078,053 B1 | 12/2011 | Mazzini et al. | |
| 8,260,103 B2 | 9/2012 | Gholami et al. | |
| 8,322,166 B2 | 12/2012 | Bookbinder et al. | |
| 8,432,539 B2 | 4/2013 | Gholami et al. | |
| 8,797,519 B2 | 8/2014 | Chen et al. | |
| 8,852,390 B2 | 10/2014 | Hayashi | |
| 9,279,741 B2 | 3/2016 | Bennett et al. | |
| 9,377,377 B2 | 6/2016 | Chen et al. | |
| 10,131,566 B2 | 11/2018 | Bowker et al. | |
| 2012/0125053 A1 | 5/2012 | Bookbinder et al. | |
| 2013/0029038 A1 | 1/2013 | Bickham et al. | |
| 2013/0322836 A1 | 12/2013 | Bickham et al. | |

FOREIGN PATENT DOCUMENTS

| | | |
|---|---|---|
| JP | 5643528 B2 | 12/2014 |
| WO | 2013/003016 A1 | 1/2013 |
| WO | 2014/206464 A1 | 12/2014 |

OTHER PUBLICATIONS

English Translation of CN201480024611.8 First Office Action dated Mar. 29, 2017, China Patent Office.
International Search Report of the International Searching Authority; PCT/US2014/035769; dated Aug. 1, 2014; 5 Pages; European Patent Office.
1120 Bare Fiber Aligner, http://www.pkinetics.com/products/productdetail.aspx?model=1120.
Kise et al, "Development of 1060nm 25-GB/s VCSEL and demonstration of 300m and 500m system reach using MMFs and link optimized for 1060nm", Optical Fiber Communication Conference, 2014, 3 pages.

METHODS FOR MODIFYING MULTI-MODE OPTICAL FIBER MANUFACTURING PROCESSES

CROSS-REFERENCE TO RELATED APPLICATIONS

This application claims the benefit of priority under 35 U.S.C. § 119 of U.S. Non-provisional application Ser. No. 14/253,994 filed on Apr. 16, 2014, which claims benefit of priority of Provisional Application Ser. No. 61/817,503 filed on Apr. 30, 2013, which are incorporated herein by reference.

BACKGROUND

Field

The present specification generally relates to optical fiber manufacturing processes and, more specifically, to methods for modifying multi-mode optical fiber manufacturing processes.

Technical Background

Manufacturing processes for producing multi-mode optical fiber typically include drawing multi-mode optical fiber from a glass perform that is heated in a draw furnace, cooling the drawn fiber, and coating the fiber after it has sufficiently cooled. Multi-mode optical fiber is typically produced to satisfy certain performance characteristics, such as for the drawn optical fiber to possess a threshold bandwidth for light emitted at a particular wavelength. The process parameters employed by the fiber manufacturing process may have a significant impact on the resultant performance characteristics of the drawn fiber. However, conventional fiber manufacturing processes may not consistently produce fiber that satisfies desired performance characteristics, such as processes that produce fiber that does not satisfy quality control tests and cannot be sold or must be sold as lower grade optical fiber.

Accordingly, a need exists for methods for modifying multi-mode optical fiber manufacturing processes.

SUMMARY

Multi-mode optical fiber may be produced to satisfy a performance characteristic, such as a bandwidth, at a particular target peak wavelength. The inventors have discovered that the actual peak wavelength of a multi-mode optical fiber may influence the performance characteristics of the fiber. For example a difference between the target peak wavelength of the multi-mode optical fiber and the actual peak wavelength (e.g., the measured or determined peak wavelength) of a multi-mode optical fiber may influence the bandwidth of the multi-mode optical fiber at the target peak wavelength. Generally, as the difference between the target peak wavelength and the actual peak wavelength increases, the bandwidth of the multi-mode optical fiber at the target peak wavelength decreases. The inventors have recognized that by measuring the actual peak wavelength of a multi-mode optical fiber and adjusting the fiber processing parameters, such as tension, in order to decrease the difference (e.g., so that the actual peak wavelength of subsequently produced fiber will be closer to the target peak wavelength), performance characteristics of the produced optical fiber may be improved.

In one embodiment, a method for modifying a process for manufacturing multi-mode optical fiber includes measuring at least one characteristic of a multi-mode optical fiber. The at least one characteristic is a modal bandwidth or a differential mode delay at one or more wavelengths. The method further includes determining a measured peak wavelength of the multi-mode optical fiber based on the measured characteristic, determining a difference between the target peak wavelength and the measured peak wavelength, and modifying the process for manufacturing multi-mode optical fiber based on the difference between the target peak wavelength and the measured peak wavelength.

In another embodiment, a method for adjusting at least one drawing process parameter in a process for manufacturing multi-mode optical fiber includes coupling light emitted from at least one light source at a plurality of wavelengths into a multi-mode optical fiber, and determining a plurality of corresponding bandwidths for light emitted at the plurality of wavelengths. Each wavelength is associated with a corresponding bandwidth. The method further includes determining a bandwidth function that fits the plurality of wavelengths and the plurality of corresponding bandwidths, and determining a measured peak wavelength of the multi-mode optical fiber based on the bandwidth function. The measured peak wavelength maximizes the bandwidth function. The method further includes determining a difference between the target peak wavelength and the measured peak wavelength, and adjusting the at least one drawing process parameter based on the difference between the target peak wavelength and the measured peak wavelength.

DETAILED DESCRIPTION

Reference will now be made in detail to various embodiments for methods for modifying multi-mode optical fiber manufacturing processes, examples of which are illustrated in the accompanying drawings. Whenever possible, the same reference numerals will be used throughout the drawings to refer to the same or like parts. In one embodiment, a method generally comprises measuring at least one characteristic of a multi-mode optical fiber. The at least one characteristic is a modal bandwidth or a differential mode delay. A measured peak wavelength of the multi-mode optical fiber is determined based on the measured characteristic. A difference between the target peak wavelength and the measured peak wavelength is determined. The process for manufacturing multi-mode optical fiber is modified based on the difference between the target peak wavelength and the measured peak wavelength. The methods for modifying multi-mode optical fiber manufacturing processes will be described in more detail herein with specific reference to the appended figures.

As used herein, the term "modal bandwidth" of a multi-mode optical fiber means the frequency at which the amplitude of the optical output power frequency spectrum drops three decibels (3 dB) relative to the zero frequency component of the fiber. Modal bandwidth is typically measured in units of (frequency)*(distance) (e.g., MHz*km or GHz*km). Alternatively, modal bandwidth may be specified as a particular frequency (e.g., in MHz or GHz) for a given length (e.g., in km).

As used herein, the term "peak wavelength" (also referred to as Lambda_P or $\lambda_p$) of a multi-mode optical fiber means a wavelength of light that maximizes a bandwidth of the multi-mode optical fiber. Techniques for measuring the peak wavelength of a multi-mode optical fiber based on multi-wavelength measurement techniques and differential mode delay techniques will be described in detail below. Multi-mode optical fiber may be produced in order to have a bandwidth exceeding a bandwidth threshold at a target peak wavelength. In some embodiments, the target peak wavelength may be between 780 nm and 1650 nm. In some embodiments, the target peak wavelength is 850 nm. In some embodiments, the target peak wavelength is 980 nm or 1060 nm. In some embodiments, the target peak wavelength is between 1260 nm and 1360 nm, such as between 1300 nm and 1320 nm. However, it should be understood that multi-mode optical fibers may be produced in order to have any target peak wavelength.

As used herein, the term "differential mode delay" of a multi-mode optical fiber is the relative delay measured when varying the offset of output pulses launched from a single-mode fiber at the input end of the multi-mode optical fiber. The detailed testing procedure for measuring differential mode delay is defined in TIA-455-220-A: FOTP-220 Differential Mode Delay Measurement of Multimode Fiber in the Time Domain.

As used herein, "drawing tension" is provided in units of grams (g). However, it should be understood that drawing tension measurements provided in grams may be converted to tension measurements in Newtons or dynes. To convert grams of drawing tension to Newtons of drawing tension, the drawing tension in grams is multiplied by 0.0098. To convert grams of drawing tension to dynes of drawing tension, the drawing tension in grams is multiplied by 980.

Figure 1:
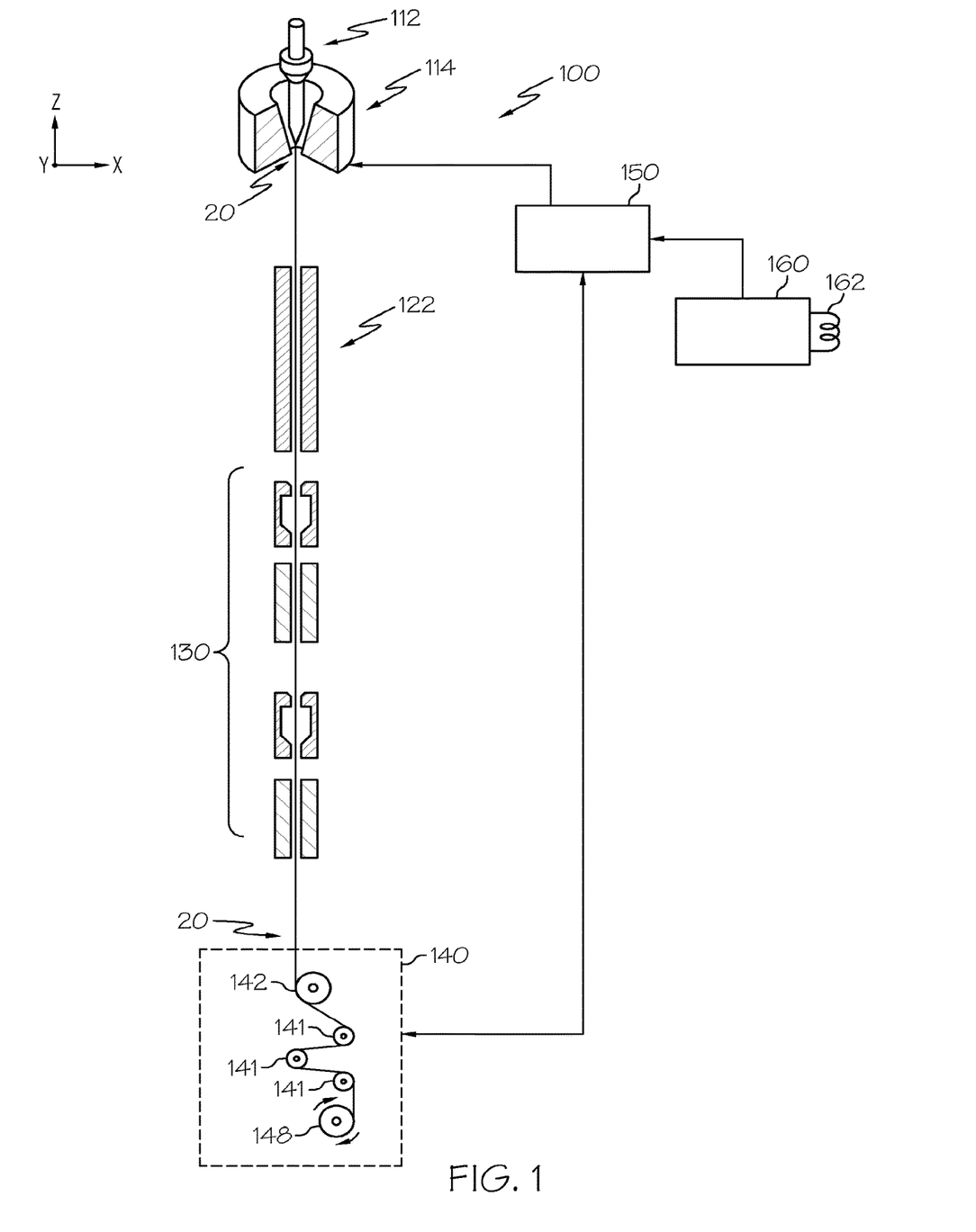
FIG. 1 schematically depicts a multi-mode optical fiber manufacturing system according to one or more embodiments shown and described herein.

Referring now to FIG. 1, one embodiment of a multi-mode optical fiber manufacturing system 100 for drawing multi-mode optical fiber 20 from a multi-mode optical fiber preform 112 is schematically depicted. Also depicted is a multi-mode optical fiber peak wavelength determination system 160, which is operable to determine a measured peak wavelength of a multi-mode optical test fiber 162 that is coupled to the multi-mode optical fiber peak wavelength determination system 160. The measured peak wavelength determined by the multi-mode optical fiber peak wavelength determination system 160 may be used to modify the process for manufacturing multi-mode optical fiber by the multi-mode optical fiber manufacturing system 100 to enhance the performance characteristics of the drawn optical fiber, as will be described in detail below.

The multi-mode optical fiber preform 112 generally comprises silica-based glass. In embodiments in which the multi-mode optical fiber preform 112 comprises silica-based glass, the multi-mode optical fiber preform 112 may include dopants that increase or decrease the refractive index of the silica-based glass relative to pure silica glass. In some embodiments, the multi-mode optical fiber preform 112 comprises a core surrounded by cladding. In some embodiments, the multi-mode optical fiber preform 112 comprises a doped or undoped glass core surrounded by a layer of doped or undoped glass. In some embodiments, the multi-mode optical fiber preform 112 may be a core blank. In other embodiments, the multi-mode optical fiber preform 112 may be a cane formed from a core blank, such as in embodiments in which the multi-mode optical fiber preform 112 is one of a plurality of canes formed from a single core blank.

In the embodiment depicted in FIG. 1, the multi-mode optical fiber manufacturing system 100 generally comprises a draw furnace 114, a fiber cooling system 122, a coating system 130, a fiber take-up system 140, and a process controller 150.

The draw furnace 114 includes a heating element that supplies heat to at least a bottom portion of the multi-mode optical fiber preform 112. In some embodiments, the draw furnace may heat the bottom portion of the multi-mode optical fiber preform 112 to a draw temperature of about 1700° C. to about 2100° C.

The multi-mode optical fiber 20 is drawn from the heated multi-mode optical fiber preform 112 and through the various stages of the multi-mode optical fiber manufacturing system 100 with the fiber take-up system 140. The fiber take-up system 140 utilizes various drawing mechanisms 142 and pulleys 141 to provide the necessary tension to the multi-mode optical fiber 20 as the multi-mode optical fiber 20 is drawn through the multi-mode optical fiber manufacturing system 100, as will be described in more detail below.

In the embodiment of the multi-mode optical fiber manufacturing system 100 depicted in FIG. 1, the multi-mode optical fiber 20 is drawn from the multi-mode optical fiber preform 112 with the fiber take-up system 140 and exits the draw furnace 114 along a substantially vertical pathway (i.e., a pathway along the z-direction). As the multi-mode optical fiber is drawn along the vertical pathway, the multi-mode optical fiber 20 may optionally be drawn through a fiber cooling system 122 that cools the multi-mode optical fiber 20 prior to one or more coatings being applied to the multi-mode optical fiber 20. The fiber cooling system 122 is generally spaced apart from the draw furnace 114 such that the multi-mode optical fiber 20 cools to temperatures significantly below the draw temperature before entering the fiber cooling system 122. For example, the spacing between the draw furnace 114 and the fiber cooling system 122 may be sufficient to cool the multi-mode optical fiber 20 from the draw temperature. While the fiber cooling system 122 has been described herein as part of the multi-mode optical fiber manufacturing system 100 for producing a multi-mode optical fiber 20, it should be understood that the fiber cooling system 122 is optional and that, in other embodiments, the multi-mode optical fiber 20 may be drawn directly from the draw furnace 114 to a coating system 130 without entering the fiber cooling system 122.

Still referring to FIG. 1, after the multi-mode optical fiber 20 exits the fiber cooling system 122, the multi-mode optical fiber 20 enters a coating system 130 where one or more coating layers are applied to the multi-mode optical fiber 20. In one embodiment described herein, the coating system 130 applies at least one polymeric coating layer to the multi-mode optical fiber 20.

Still referring to FIG. 1, the process controller 150 may include a processor communicatively coupled to a memory. The memory contains computer readable and executable instructions which are executed by the processor to control the process for manufacturing multi-mode optical fiber and/or to modify the process for manufacturing multi-mode optical fiber, as described herein. In some embodiments, the computer readable and executable instructions which are executed by the processor to adjust at least one drawing process parameter in order to modify the process for manufacturing multi-mode optical fiber, as will be described in further detail below. In the embodiment depicted in FIG. 1, the process controller 150 is communicatively coupled to the draw furnace 114 and the fiber take-up system 140 and may modify the process for manufacturing multi-mode optical fiber as described herein by modifying a temperature of the draw furnace 114 and/or modifying the tension applied by the fiber take-up system 140, such as by adjusting a drawing speed of the fiber take-up system 140. In some embodiments, the process controller 150 may only be communicatively coupled to one of the draw furnace 114 and the fiber take-up system 140, such as in embodiments in which the process for manufacturing multi-mode optical fiber is adjusted by modifying only one of the temperature of the draw furnace 114 and the tension applied by the fiber take-up system 140.

As noted hereinabove, the multi-mode optical fiber peak wavelength determination system 160 determines a measured peak wavelength of a multi-mode optical test fiber 162. The multi-mode optical fiber peak wavelength determination system 160 may include a processor communicatively coupled to a memory. The memory contains computer readable and executable instructions which are executed by the processor to determine the measured peak wavelength of the multi-mode optical test fiber 162 based on at least one measured characteristic of the multi-mode optical test fiber 162, as will be described below.

In some embodiments, such as the embodiment depicted in FIG. 1, the multi-mode optical test fiber 162 may be provided for use in the multi-mode optical fiber peak wavelength determination system 160 by separating a multi-mode optical fiber test segment from drawn multi-mode optical fiber 20. The separated multi-mode optical fiber test segment may then be coupled to the multi-mode optical fiber peak wavelength determination system 160 (e.g., via mechanical splicing or fusion splicing) so that the measured peak wavelength of the separated fiber may be determined. In some embodiments, the multi-mode optical fiber test segment may be transferred to a spool before coupling the multi-mode optical fiber test segment to the multi-mode optical fiber peak wavelength determination system 160. The multi-mode optical fiber test segment may be obtained at the initiation of the drawing process. In some embodiments, multiple multi-mode optical fiber test segments may be separated and coupled to the multi-mode optical fiber peak wavelength determination system 160, such as in embodiments in which fiber drawn during a single process run is wound to multiple spools (e.g., using an indexing winder) and a multi-mode optical fiber test segment is separated during a spool change. Furthermore, a multi-mode optical fiber test segment may be separated and coupled to the multi-mode optical fiber peak wavelength determination system 160 at predefined intervals, such as once per 20 km, once per 30 km, once per 50 km, or at any other interval.

In other embodiments, the multi-mode optical fiber peak wavelength determination system 160 may determine the measured peak wavelength of the drawn multi-mode optical fiber 20 before the fiber is separated from the multi-mode optical fiber perform 112. For example, in some embodiments, the multi-mode optical fiber peak wavelength determination system 160 may determine the measured peak wavelength of the drawn multi-mode optical fiber via an online peak wavelength measurement system that measures the peak wavelength of the drawn multi-mode optical fiber 20 in real time as the fiber is drawn, as described below Such an online measurement system allows the peak wavelength of the drawn multi-mode optical fiber 20 to be measured and process parameters to be adjusted in substantially real time.

Figure 4:
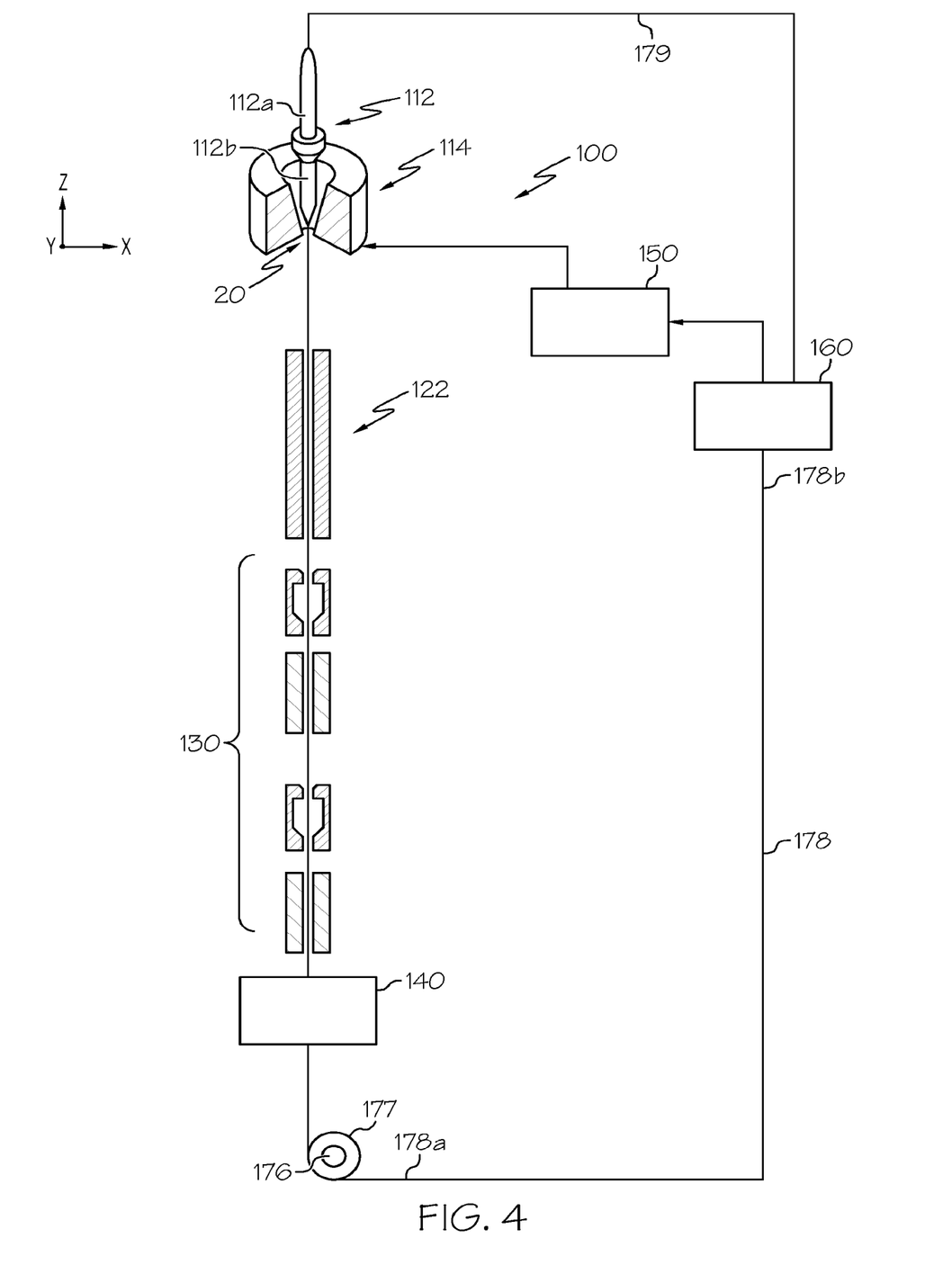
FIG. 4 schematically depicts a substantially real time peak wavelength determination system according to one or more embodiments shown and described herein.

For example, one embodiment of a peak wavelength determination system 400 in which the multi-mode optical fiber peak wavelength determination system 160 determines the measured peak wavelength of the drawn multi-mode optical fiber 20 substantially in real time as the multi-mode optical fiber 20 is drawn is depicted in FIG. 4. In the peak wavelength determination system 400 depicted in FIG. 4, the multi-mode optical fiber 20 is drawn and wound into a coil 177 onto a support spool 176. The multi-mode optical fiber 20 is optically coupled to a first end 178a of a first test fiber 178. In some embodiments, the multi-mode optical fiber 20 is optically coupled to the first end 178a of the first test fiber 178 with a rotating optical coupler include in the support spool 176, such as a fiber optic rotary joint (FORJ) device operable to connect two fiber ends, allowing free rotation between them with minimal optical signal loss. The rotating optical coupler allows the multi-mode optical fiber 20 to remain in a relatively fixed position to allow for effective coupling to the first test fiber 178.

Still referring to FIG. 4, a second end 178b of the first test fiber 178 is optically coupled to the multi-mode optical fiber peak wavelength determination system 160, such as by a fiber coupler. The multi-mode optical fiber peak wavelength determination system 160 is also optically coupled to the multi-mode optical fiber preform 112 by a second test fiber 179. Thus, the multi-mode optical fiber peak wavelength determination system 160 effectively completes an optical loop formed by the first test fiber 178, the multi-mode optical fiber 20, the multi-mode optical fiber perform 112, and the second test fiber 179. While the embodiment depicted in FIG. 4 includes the first test fiber 178 and the second test fiber 179, it should be understood that some embodiments may not include the first test fiber 178 or the second test fiber 179, such as embodiments in which the multi-mode optical fiber 20 and/or the multi-mode optical fiber perform 112 are directly coupled to the multi-mode optical fiber peak wavelength determination system 160.

Still referring to FIG. 4, in operation, the multi-mode optical fiber peak wavelength determination system 160 may launch light through one end of the optical loop (either the first test fiber 178 or the second test fiber 179), receive the launched light through the other end of the optical loop (either the second test fiber 179 or the first test fiber 178), and determine the measured peak wavelength of the multi-mode optical fiber 20 based on the received light based on differential mode delay measurements or multi-wavelength bandwidth determination measurements, as will be described in detail below. Specifically, in some embodiments, the multi-mode optical fiber peak wavelength determination system 160 may launch light into the first test fiber 178, which traverses through the multi-mode optical fiber 20, through the multi-mode optical fiber perform 112, through the second test fiber 179, and is received back at the multi-mode optical fiber peak wavelength determination system 160, which then determines the measured peak wavelength of the multi-mode optical fiber 20 based on the received light. In other embodiments, the multi-mode optical fiber peak wavelength determination system 160 may launch light into the second test fiber 179, which traverses through the multi-mode optical fiber perform 112, through the multi-mode optical fiber 20, through the first test fiber 178, and is received back at the multi-mode optical fiber peak wavelength determination system 160, which then determines the measured peak wavelength of the multi-mode optical fiber 20 based on the received light.

Accordingly, it should be understood that such a peak wavelength determination system 400 may determine the measured peak wavelength of the drawn multi-mode optical fiber 20 substantially in real time as the multi-mode optical fiber 20 is drawn. It should also be understood that there are a variety of alternative systems and methods for determining the measured peak wavelength of the drawn multi-mode optical fiber 20 substantially in real time other than the peak wavelength determination system 400 shown in FIG. 4 and described above. For example, in some embodiments, light may be launched directly into the multi-mode optical fiber perform 112, which travels through the multi-mode optical fiber 20, through the first test fiber 178, and is received by the multi-mode optical fiber peak wavelength determination system 160. In some embodiments, light may be launched at an angle into any of the first test fiber 178, the multi-mode optical fiber 20, the multi-mode optical fiber perform 112, and the second test fiber 179. Furthermore, in some embodiments, the multi-mode optical fiber peak wavelength determination system 160 may launch light into an end of the multi-mode optical fiber 20 (either directly or via the first test fiber 178), which travels through the multi-mode optical fiber perform 112, is incident upon a reflector, and returns to the multi-mode optical fiber peak wavelength determination system 160 along the same path.

Referring once again to FIG. 1, the multi-mode optical fiber peak wavelength determination system 160 is communicatively coupled to the process controller 150. However, in some embodiments, the multi-mode optical fiber peak wavelength determination system 160 may not be communicatively coupled to the process controller 150, such as in embodiments in which the multi-mode optical fiber peak wavelength determination system 160 is separate from the multi-mode optical fiber manufacturing system 100, but at least one parameter of the multi-mode optical fiber manufacturing system 100 is modified or adjusted based on the peak wavelength of the multi-mode optical test fiber 162 as determined by the multi-mode optical fiber peak wavelength determination system 160.

Having described the various components of the multi-mode optical fiber manufacturing system 100 and the interrelationship thereof, a method for modifying a process for manufacturing multi-mode optical fiber based on a measured peak wavelength will now be described.

A method for modifying a process for manufacturing multi-mode optical fiber may include measuring at least one characteristic of a multi-mode optical fiber and determining a measured peak wavelength of the multi-mode optical fiber based on the measured characteristic. For example, in some embodiments, a process for manufacturing multi-mode optical fiber with the multi-mode optical fiber manufacturing system 100 may be modified based on a peak wavelength of the multi-mode optical test fiber 162, as determined by the multi-mode optical fiber peak wavelength determination system 160. The multi-mode optical fiber peak wavelength determination system 160 may determine the measured peak wavelength of the multi-mode optical test fiber 162 in a variety of ways, two of which will be described in detail below.

1. Determining Measured Peak Wavelength Based on Multi-Wavelength Measurement Techniques In some embodiments, a modal bandwidth of the multi-mode optical test fiber 162 may be measured by the multi-mode optical fiber peak wavelength determination system 160 using a multi-wavelength measurement technique. The measured peak wavelength of the multi-mode optical test fiber 162 may be determined based on the measured modal bandwidth. The multi-wavelength measurement technique may include emitting light at a plurality of wavelengths from at least one light source coupled to the multi-mode optical test fiber 162. The multi-mode optical fiber peak wavelength determination system 160 may then determine a plurality of corresponding modal bandwidths for light emitted at the plurality of wavelengths. The multi-mode optical fiber peak wavelength determination system 160 may then determine a bandwidth function that fits the plurality of wavelengths and the plurality of corresponding bandwidths, and determine the measured peak wavelength as the wavelength that maximizes the bandwidth function, as described in the following paragraphs with reference to one embodiment of the multi-mode optical fiber peak wavelength determination system 160 that is shown in FIG. 5.

Figure 5:
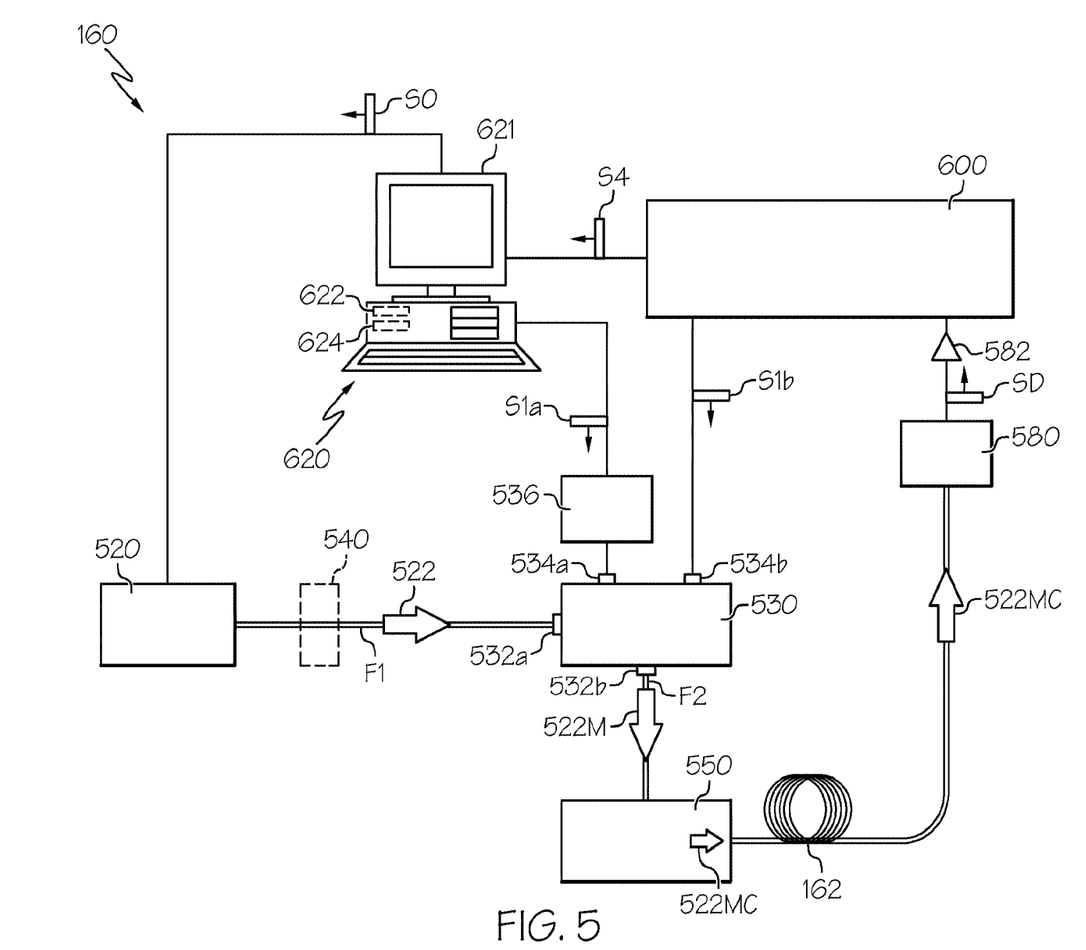
FIG. 5 schematically depicts an exemplary multi-mode optical fiber peak wavelength determination system according to one or more embodiments shown and described herein.

FIG. 5 is a schematic diagram of an example multi-mode optical fiber peak wavelength determination system 160. The multi-mode optical fiber peak wavelength determination system 160 includes a tunable light source 520, an optional polarization controller 540, an optical modulator 530, a mode conditioner 550, a photodetector 580, a network analyzer 600, a computer 620, and a power supply 536.

Still referring to FIG. 5, the tunable light source 520 may be configured to emit light 522 having a select (central) wavelength $\lambda$ and a narrow spectral width $\delta\lambda$. In one example, $\delta\lambda \leq 0.1$ nm or less, while in another example $\delta\lambda \leq 0.05$ nm, while in yet another example, $\delta\lambda \leq 0.02$ nm. In some embodiments, the tunable light source 520 is tunable over a wavelength range $\Delta\lambda$, which in various example $\Delta\lambda \geq 50$ nm, $\Delta\lambda \geq 70$ nm and $\Delta\lambda \geq 80$ nm. In an example, 50 nm $\leq \Delta\lambda \leq 150$ nm. In some embodiments, the tunable light source 520 can generate light 522 at three wavelengths $\lambda_1$, $\lambda_2$ and $\lambda_3$ that in various examples are separated from each other by at least 4 nm, or by at least 10 nm, or by at least 15 nm apart. In various examples, the tunable wavelength range can reside between the wavelengths of 800 nm and 1650 nm. Example wavelength ranges extend from 790 to 880 nm or 990 nm to 1070 nm, or 1260 to 1360 nm, or 1400 nm to 1550 nm, or 1500 nm to 1650 nm. In an example, the wavelength range $\Delta\lambda$ is 50 nm to 150 nm wide and resides within a wavelength window between 750 nm and 1650 nm. In other examples, the wavelength window is 790 nm to 890 nm or 1260 nm to 1360 nm or 1450 nm to 1600 nm. Three example embodiments of the tunable light source 520 are described below. However, it should be understood that the tunable light source 520 may be implemented in a manner other than specifically described herein.

Figure 6:
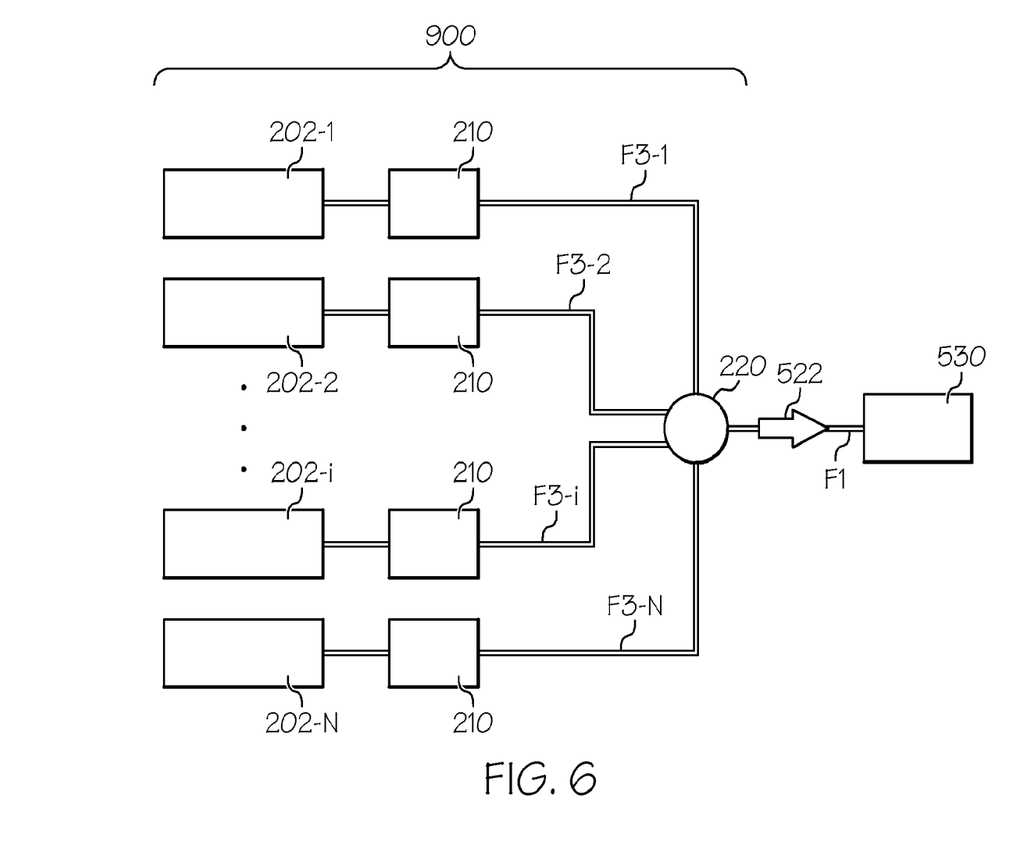
FIG. 6 schematically depicts a tunable light source including plurality of programmable polarization controllers according to one or more embodiments shown and described herein.

Referring now to FIG. 6, another embodiment of a tunable light source is schematically depicted. Tunable light source 900 provides light sources at a plurality of wavelengths. The tunable light source 900 includes N single-mode lasers, denoted 202-1, 202-2, . . . 202-$i$, 202-N that emit light corresponding to wavelengths $\lambda_1, \lambda_2, \ldots \lambda_i, \lambda_N$, respectively. The N single-mode lasers are optically coupled to an N×1 optical switch 220 via respective single-mode optical fiber sections F3-1, F3-2, . . . F3-$i$, F3-N. In some embodiments in which the optical fiber sections F3 are not polarization maintaining, the tunable light source 900 may include a plurality of programmable polarization controllers 210 arranged in each optical fiber section F3. In some embodiments, the N×1 optical switch 220 is programmable or may be controlled by the computer 620. Programmable polarization controllers 210 may be manual polarization controllers or may be controlled by the computer 620.

Figure 7:
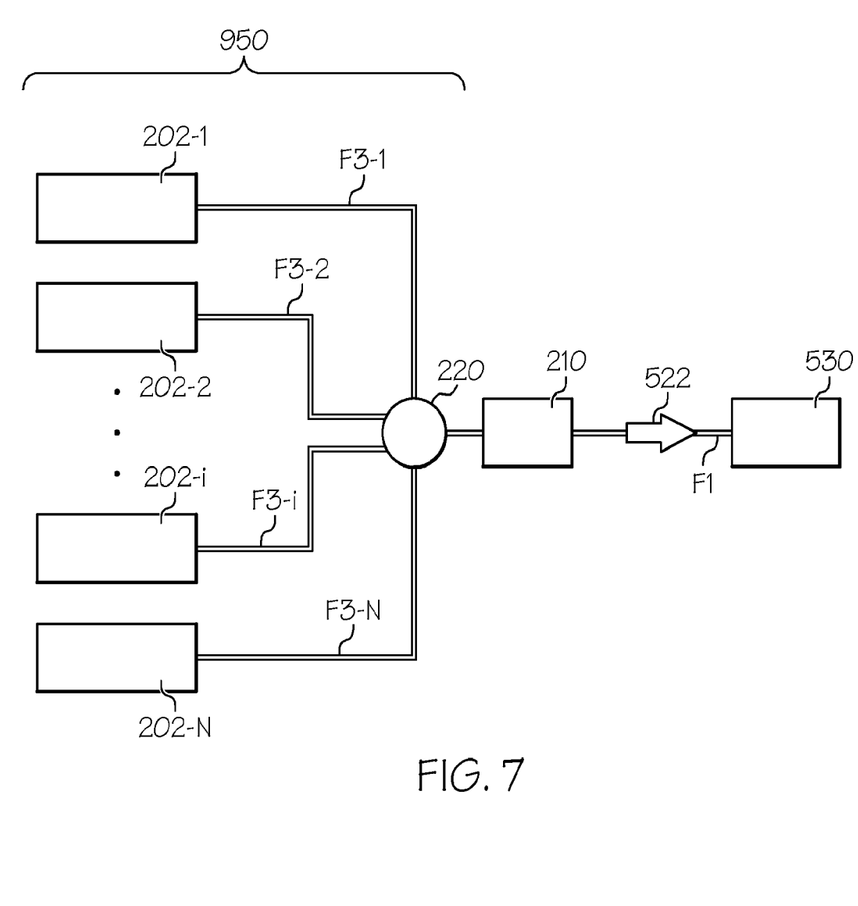
FIG. 7 schematically depicts a tunable light source including a single polarization controller according to one or more embodiments shown and described herein.

FIG. 7 schematically depicts a tunable light source 950. FIG. 7 is similar to FIG. 6 and illustrates a tunable light source 950 in which a single programmable polarization controller 210 is arranged between the N×1 optical switch 220 and the optical modulator 530. However, it should be understood that in embodiments in which the optical fiber sections F1 and F3 are polarization-maintaining, programmable polarization controller 210 is not required.

Figure 8:
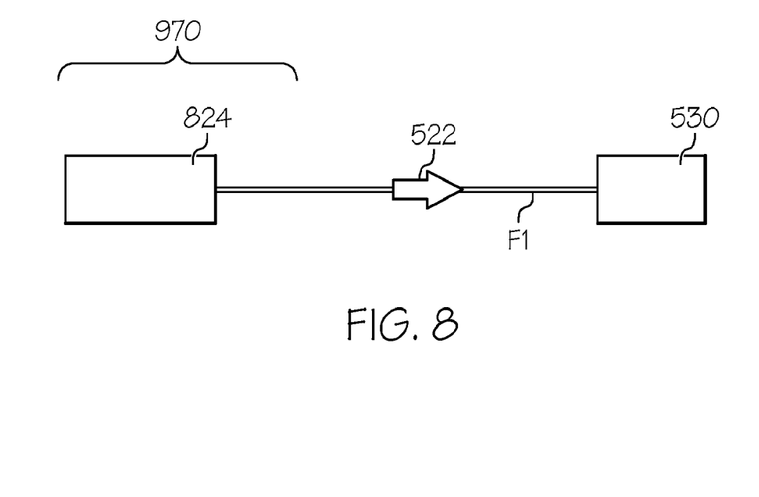
FIG. 8 schematically depicts a tunable light source including a single tunable light emitter according to one or more embodiments shown and described herein.

FIG. 8 schematically depicts a tunable light source 970. FIG. 8 is similar to FIG. 7 and illustrates an example embodiment in which the tunable light source 970 includes a single tunable light emitter 824. In some embodiments, the single tunable light emitter 824 is a superluminescent diode. In some embodiments, the superluminescent diode emits light from about 825 nm to about 874 nm. In other embodiments, the superluminescent diode emits light from 793 nm to 880 nm. In other embodiments, the single tunable light emitter 824 is a tunable laser that emits light in the range from 1260 nm to 1360 nm.

Referring once again to FIG. 5, a first optical fiber section F1 optically couples the tunable light source 520 to an input optical port 532$a$ of the optical modulator 530. In some embodiments, the first optical fiber section F1 is polarization-maintaining with its state of polarization aligned such that no additional polarization management is needed. In other embodiments in which the first optical fiber section F1 is not polarization maintaining, a polarization controller 540 can be operably arranged in the first optical fiber section F1 between the tunable light source 520 and the optical modulator 530. In some embodiments, the optical modulator 530 is a lithium-niobate-based modulator. In some embodiments, the tunable light source 520 includes a pigtail fiber (not shown) that is optically coupled to the first optical fiber section F1.

Still referring to FIG. 5, the optical modulator 530 includes two electrical ports 534$a$ and 534$b$. The two electrical ports 534$a$ and 534$b$ are used to set a bias control voltage and provide RF driving signals, respectively. A power supply 536, which sets a DC voltage is electrically connected to electrical port 534$a$ and a network analyzer 600 is electrically connected to the electrical port 534$b$.

Still referring to FIG. 5, the multi-mode optical fiber peak wavelength determination system 160 further includes a mode conditioner 550 optically coupled to the output end 532$b$ of the optical modulator 530 via a second single-mode optical fiber section F2. In some embodiments, mode conditioner 550 may be a commercially available mode conditioner, such as the ModCon mode controller sold by Arden Photonics, Ltd., West Midland, United Kingdom. In some embodiments, the mode conditioner 550 may employ a multimode fiber (e.g., 50 micron core radius) and generates a Gaussian light intensity profile radially across the multi-mode fiber core and may provide a launch condition similar to the launch condition of a VCSEL. In other embodiments, the mode conditioner 550 may be a customized device that is designed to provide the launch conditions for various type of lasers and optics.

Still referring to FIG. 5, the mode conditioner 550 in turn is optically coupled to an input end of a multi-mode optical test fiber 162 whose measured peak wavelength is to be determined. In an example, the multi-mode optical test fiber 162 has a select length, e.g., 1 km or many other lengths of choices, such as 100 m, 300 m, 2.2 km, 5.6 km, 8.8 km or even 16.5 km. Thus, in an example, the multi-mode optical test fiber 162 has a length in the range from 100 m to 16.5 km.

Still referring to FIG. 5, the multi-mode optical test fiber 162 includes an output end that is optically coupled to a photodetector 580. The photodetector 580 is electrically connected to the network analyzer 600 and generates detector signals SD, which are received and analyzed by the network analyzer 600. In some embodiments, the photodetector 580 includes an internal linear amplifier (not shown) to boost the strength of detector signals SD. In other embodiments, such as the embodiment depicted in FIG. 5, an external linear amplifier 582 disposed between the photodetector 580 and the network analyzer 600 is also used to further boost the strength of detector signals SD.

Still referring to FIG. 5, the multi-mode optical fiber peak wavelength determination system 160 also includes a computer 620 that is electrically connected to the tunable light source 520, the network analyzer 600, and the power supply 536. The computer 620 includes a display 621. In an example, the computer 620 comprises a computer or like machine that is adapted (e.g., via instructions such as software embodied in a computer-readable or machine-readable medium) to cause the computer to control the operation of the various components of the multi-mode optical fiber peak wavelength determination system 160. The computer 620 includes a processor unit ("processor") 622 and a memory unit ("memory") 624. An example computer 620 is or includes a computer with a processor and includes an operating system such as Microsoft WINDOWS or LINUX or Apple's OS X. The processor 622 may include any processor or device capable of executing a series of software instructions and includes, without limitation, a general-purpose or special-purpose microprocessor, finite state machine, computer, computer, central-processing unit (CPU), field-programmable gate array (FPGA) or digital signal processor. The memory 624 is operably connected to the processor 622. As used herein, the term "memory" refers to any processor-readable medium, including but not limited to RAM, ROM, EPROM, PROM, EEPROM, disk, floppy disk, hard disk, CD-ROM, DVD or the like, on which may be stored a series of instructions executable by the processor 622.

Still referring to FIG. 5, the peak wavelength measurement methods described herein may be implemented in various embodiments in a machine-readable medium (e.g., the memory 624) comprising machine readable instructions (e.g., computer programs and/or software modules) for causing the computer 620 to perform the measurement methods described herein by controlling the operation of the multi-mode optical fiber peak wavelength determination system 160. In some embodiments, the computer programs may be executed by the processor 622 from the memory 624. The computer programs and/or software modules may comprise multiple modules or objects in order to perform the various methods of the present disclosure and to control the operation and function of the various components of the multi-mode optical fiber peak wavelength determination system 160. The type of computer programming languages used for the code may range from procedural code-type languages to object-oriented languages. The files or objects need not have a one-to-one correspondence to the modules or method steps described. Further, the method and system may comprise combinations of software, hardware and firmware. Firmware can be downloaded into the processor 622 for implementing the various example embodiments disclosed herein.

In an example of the operation of the multi-mode optical fiber peak wavelength determination system 160 depicted in FIG. 5, the computer 620 may cause a control signal S0 to be sent to the tunable light source 520, which causes the tunable light source 520 to emit light 522 having a first wavelength $\lambda_1$. In another example, the tunable light source 520 is controlled manually rather than via the computer 620. In one example embodiment, the first wavelength $\lambda_1$ can be about 807 nm, while subsequent wavelengths $\lambda_2$ and $\lambda_3$ can be about 850 nm and 894 nm, respectively.

Still referring to FIG. 5, the light 522 travels through the optical modulator 530, which is electrically controlled by the computer 620 via the power supply 536 and by the network analyzer 600. The computer 620 may control the optical modulator 530 by controlling a bias control voltage set by the power supply 536 via a control signal S1a from the computer 620. The bias voltage can be wavelength dependent, in which case it may be set for the optimal value for each wavelength. The optimal bias voltage may be determined beforehand and input into the computer 620. The computer 620 can then control the power supply 536 to deliver the proper bias voltage through the use of a standard control interface, such as GPIB, USB, RS-232, or Ethernet. Alternatively, an automatic bias control circuit (not shown) may be employed to set the bias voltage automatically by monitoring the input and output light as tapped from a couple fiber splitters (not shown).

Still referring to FIG. 5, the network analyzer 600 may control the optical modulator 530 by providing a frequency control signal S1b (e.g., a RF drive signal) to the optical modulator 530 to sweep the modulation frequency over a select range frequency range $\Delta f = f_H - f_L$ where $f_H$ is the highest frequency in the range and $f_L$ is the lowest frequency in the range. In some embodiments, the lowest frequency $f_L$ of frequency range $\Delta f$ is 10 Khz or 100 KHz or 500 KHz or 1 MHz or 5 MHz or 10 MHz or 200 Mhz or any number in between. In some embodiments, the highest frequency $f_H$ of frequency range $\Delta f$ is 100 MHz, or 500 MHz, or 1 GHz, or 10 GHz or 20 GHz or 40 GHz or 60 GHz or any number in between.

Thus, control signals S1a and S1b from the computer 620 and the network analyzer 600 are used to control the optical modulator 530 so that the optical modulator 530 converts the light 522 into modulated light 522M. The modulated light 522M then passes through the fiber section F2 and then through the mode conditioner 550. The mode conditioner 550 is configured to recondition the modulated light 522M from its single-mode light distribution into a multi-mode light distribution suitable for launching into the multi-mode optical test fiber 162. Thus, the modulated light 522M exits the mode conditioner 550 and enters the input end the multi-mode optical test fiber 162 as mode-conditioned modulated light 522MC.

Still referring to FIG. 5, the mode-conditioned modulated light 522MC travels through the multi-mode optical test fiber 162 as a guided wave that travels in the multiple modes, and then exits the multi-mode optical test fiber 162 at the output end. The light output from the multi-mode optical test fiber 162 is then detected by the photodetector 580. The photodetector 580 receives and converts the light output by the multi-mode optical test fiber 162 to detector signal SD. In an example, detector signal SD is amplified either within the photodetector 580 or by the external linear amplifier 582. The detector signal SD is then received and analyzed by the network analyzer 600, which analyzes the detector signal SD.

Still referring to FIG. 5, the multi-mode optical fiber peak wavelength determination system 160 may determine a bandwidth of the multi-mode optical test fiber 162 based on the detector signal SD received by the network analyzer 600 that corresponds to the wavelength of light emitted by the tunable light source 520. In some embodiments, the bandwidth of the multi-mode optical test fiber 162 at the wavelength emitted by the tunable light source 520 may be determined by: determining the optical transfer function of the multi-mode optical test fiber 162 (which may need to be adjusted or calibrated based on the set-up of the multi-mode optical fiber peak wavelength determination system 160) and determining the bandwidth based on the optical transfer function (e.g., the frequency at the 3 optical dB or 6 electric dB below the signal level at the zero modulation frequency). The bandwidth of the multi-mode optical test fiber 162 is determined in this manner for light emitted at each of a plurality of wavelengths. For example, a first bandwidth BW1 of the multi-mode optical test fiber 162 may be determined for light emitted at a first wavelength $\lambda_1$. Then, a second bandwidth BW2 of the multi-mode optical test fiber 162 may be determined for light emitted at a second wavelength $\lambda_2$. Then, a third bandwidth BW3 of the multi-mode optical test fiber 162 may be determined for light emitted at a third wavelength $\lambda_3$. Once the bandwidths are determined at each desired wavelength, a bandwidth function is determined that fits the plurality of wavelengths and the plurality of corresponding bandwidths. In some embodiments, the bandwidth function may be derived from a Gaussian model for a multimode optical fiber. The measured peak wavelength of the multi-mode optical test fiber 162 is then determined from the bandwidth function as the wavelength that maximizes the bandwidth function.

Thus, it should be understood that multi-mode optical fiber peak wavelength determination system 160 depicted in FIG. 5 and described above is operable to emit light at a plurality of wavelengths from at least one light source coupled to the multi-mode optical test fiber 162, determine a plurality of corresponding modal bandwidths for light emitted at the plurality of wavelengths, determine a bandwidth function that fits the plurality of wavelengths and the plurality of corresponding bandwidths, and then determine the measured peak wavelength of the multi-mode optical test fiber 162 as the wavelength that maximizes the bandwidth function.

2. Determining Measured Peak Wavelength Based on Differential Mode Delay Measurement In some embodiments, differential mode delay data may be measured for the multi-mode optical test fiber 162 by the multi-mode optical fiber peak wavelength determination system 160 and the measured peak wavelength of the multi-mode optical test fiber 162 may be determined based on the measured differential mode delay data. For example, a differential mode delay test may be performed on the multi-mode optical test fiber 162 and raw differential mode delay data may be obtained. The raw differential mode delay data may include the measured intensity of the optical pulse at a range of radial offsets from the centerline of the multi-mode optical test fiber 162. From the raw differential mode delay data, the RMS center (which may be referred to as the "DMD centroid" or D) of the optical pulse may be further calculated at each radial offset r, to generate a plurality of (D, r) pairs. The (D,r) pairs may be fitted to a function of the form $D=a+DMD_{slope}*(r/R)^2$, where a and $DMD_{slope}$ are constants and R is the maximal radial offset for which differential mode delay data was obtained. Using a least squares weighted method, the values of a and $DMD_{slope}$ may be determined through a best fitting procedure. From the determined value for $DMD_{slope}$, the measured peak wavelength may be determined according to the following equation: $\lambda_{p,\ measured}=850-DMD_{slope}*255.0$. For example, FIG. 9 depicts a plot of actual DMD centroid data along with the best fit DMD centroid line to fit the actual DMD centroid data. From the best fit DMD centroid line, a is determined to be 0.0276 and $DMD_{slope}$ is determined to be −0.142. From these parameters, the measured peak wavelength is determined to be $\lambda_{p,\ measured}=850-DMD_{slope}*255.0=850-(-0.142)*255.0=886.21$ nm. While the equations above are applicable for a multimode optical fiber with a peak wavelength within 100 nm of 850 nm (e.g., with a peak wavelength between 750 nm and 950 nm), it should be understood that similar equations may be derived for multimode optical fibers with a peak wavelength other than 850 nm.

Once the measured peak wavelength of the multi-mode optical test fiber 162 is determined with the multi-mode optical fiber peak wavelength determination system 160, a difference between the target peak wavelength and the measured peak wavelength is determined. For example, the difference $\Delta\lambda_p$ may be determined as $\Delta\lambda_p=\lambda_{p,\ target}-\lambda_{p,\ measured}$.

The process for manufacturing multi-mode optical fiber is then modified based on the difference between the target peak wavelength and the measured peak wavelength. In some embodiments, the process for manufacturing multi-mode optical fiber is modified by adjusting at least one drawing process parameter. The adjusted drawing process parameter may include a temperature of a drawing furnace, a drawing speed of the multi-mode optical fiber, or a mechanically applied drawing tension of the multi-mode optical fiber.

The process for manufacturing multi-mode optical fiber may be modified in order to achieve a desired drawing tension associated with a target peak bandwidth. For example, in some embodiments, the process for manufacturing multi-mode optical fiber is modified by adjusting a drawing tension according to the following equation: $\Delta\lambda_p=c*\Delta T_g$, wherein $\Delta T_g$ is a drawing tension adjustment amount and $\Delta\lambda_p$ is the difference between the target peak wavelength and the measured peak wavelength. The drawing tension adjustment may be effectuated by adjusting the temperature of the draw furnace 114 or adjusting the drawing speed of the fiber take-up system 140. Typically, an increase in the temperature of the draw furnace 114 will cause a decrease in drawing tension and a decrease in the temperature of the draw furnace 114 will cause an increase in drawing tension. Generally, an increase in the drawing speed of the fiber take-up system 140 will cause an increase in drawing tension and a decrease in the drawing speed of the fiber take-up system 140 will cause a decrease in drawing tension.

In some embodiments, the process for manufacturing multi-mode optical fiber is modified when the difference between the target peak wavelength and the measured peak wavelength exceeds a threshold. In one embodiment, the process for manufacturing multi-mode optical fiber is modified by halting the process for manufacturing multi-mode optical fiber when the difference between the target peak wavelength and the measured peak wavelength exceeds a threshold. For example, in one embodiment, a multi-mode optical fiber may be required to meet a bandwidth requirement at a particular wavelength (e.g., 850 nm) in order to be characterized as fiber of a particular quality grade (e.g., OM4 fiber). In other embodiments, a multi-mode optical fiber may be required to have a bandwidth above a threshold (e.g., 500 MHz*km) with an overfilled launch condition at 1300 nm in order to be characterized as a passing fiber. When the difference between the target peak wavelength and the measured peak wavelength exceeds a determined threshold, a determination may be made that the fiber will not satisfy the bandwidth requirement and production of the fiber may be halted, thereby reducing the waste resulting from producing failing fiber.

In some embodiments, the process for manufacturing multi-mode optical fiber may be halted and the process for manufacturing multi-mode optical fiber may be restarted after the process for manufacturing multi-mode optical fiber is modified. For example, in some embodiments, a multi-mode optical fiber test segment may be separated from drawn multi-mode optical fiber 20. The separated multi-mode optical fiber test segment may then be coupled to the multi-mode optical fiber peak wavelength determination system 160 (e.g., via mechanical splicing or fusion splicing) so that the peak wavelength of the separated fiber may be determined. Once the measured peak wavelength of the separated fiber is determined, a difference between the target peak wavelength and the measured peak wavelength may be determined, the process may be modified based on the difference (e.g., by adjusting the tension), and the process may be restarted after the process is modified.

In some embodiments, a core blank may be formed. A plurality of core canes (e.g., four) may be drawn from the core blank. The core canes drawn from the same core blank, sometimes referred to as "sister canes" typically share similar physical properties. The plurality of core canes may be further processed to form respective preforms for drawing into multimode fibers (e.g., a first core cane preform, a second core cane preform, etc.). The multi-mode optical fiber may be drawn from a first core cane preform, the drawing process may be modified based on a measured peak wavelength of the fiber drawn from the first core cane preform, and additional multi-mode optical fiber may be drawn from a second core cane preform after the process for manufacturing multi-mode optical fiber is modified so that fiber drawn from the second core cane preform will have a peak wavelength (and resultant performance characteristics) closer to the target peak wavelength (and resultant performance characteristics). For example, a core blank may be separated into four core canes, which are further processed to form respective core cane preforms for drawing into multimode fibers (e.g., a first core cane preform, a second core cane preform, a third core cane preform, and a fourth core cane preform). A first multi-mode optical fiber may be drawn from the first core cane preform. The first multi-mode optical fiber drawn from the first core cane preform may then be coupled to the multi-mode optical fiber peak wavelength determination system 160. The measured peak wavelength of the first multi-mode optical fiber may be determined by the multi-mode optical fiber peak wavelength determination system 160 (e.g., by using the multi-wavelength measurement techniques or differential mode delay techniques described in detail hereinabove). At least one drawing process parameter (e.g., the temperature of the draw furnace 114, the drawing speed of the fiber take-up system 140, the drawing tension, or the like) may be adjusted based on a difference between the target peak wavelength and the measured peak wavelength and fiber may be drawn from one or more additional core cane preforms (e.g., the sister core canes of the first core cane) using the adjusted drawing tension.

It should be understood that the methods described herein may modify multi-mode optical fiber manufacturing processes based on measured peak wavelength in order to produce multi-mode optical fiber having consistent performance characteristics at or above a desired level. For example, the methods described herein may modify multi-mode optical fiber manufacturing processes based on a difference between a target peak wavelength and a measured peak wavelength by adjusting drawing tension in a manner that produces fiber closer to the target peak wavelength, thereby possessing enhanced bandwidth characteristics. Such manufacturing processes may avoid wasted fiber and avoid producing low quality fiber.

The following examples will aid in further understanding the claimed subject matter. However, it should be understood that the claimed subject matter is not limited in any way by the following examples.

Example 1

In one example, a number of multi-mode optical fibers were drawn at different drawing tensions, the measured peak wavelength of each of the four drawn multi-mode optical fibers was determined, a function defining the relationship between drawing tension and peak wavelength was established, the measured peak wavelength of a test segment of drawn fiber was determined, a difference between a target peak wavelength and the measured peak wavelength of the test segment was determined, and the process for manufacturing multi-mode optical fiber was modified based on the difference between the target peak wavelength and the measured peak wavelength, as will be described in further detail below.

As noted above, in this example, a number of multi-mode optical fibers were drawn at different drawing tensions. Four multi-mode optical fibers were drawn at a draw speed of about 70 meters per minute. The drawing tension of each of the four multi-mode optical fibers was adjusted by adjusting the temperature of the drawing furnace. Specifically, the first multi-mode optical fiber was drawn at a tension of 54 g (corresponding to a drawing furnace temperature of 2080° C.), the second multi-mode optical fiber was drawn at a tension of 63 g (corresponding to a drawing furnace temperature of 2030° C.), the third multi-mode optical fiber was drawn at a tension of 89 g (corresponding to a drawing furnace temperature of 1980° C.), and the fourth multi-mode optical fiber was drawn at a tension of 147 g (corresponding to a drawing furnace temperature of 1930° C.). Each time the tension was adjusted by adjusting the temperature of the drawing furnace, the root was slightly altered, resulting in a drawing speed change. After about 2-3 minutes, the drawing speed stabilized at about 70 meters per minute. After the drawing speed stabilized, about 500 meters of multi-mode fiber were drawn and separated for coupling to the multi-mode optical fiber peak wavelength determination system 160.

Figure 2:
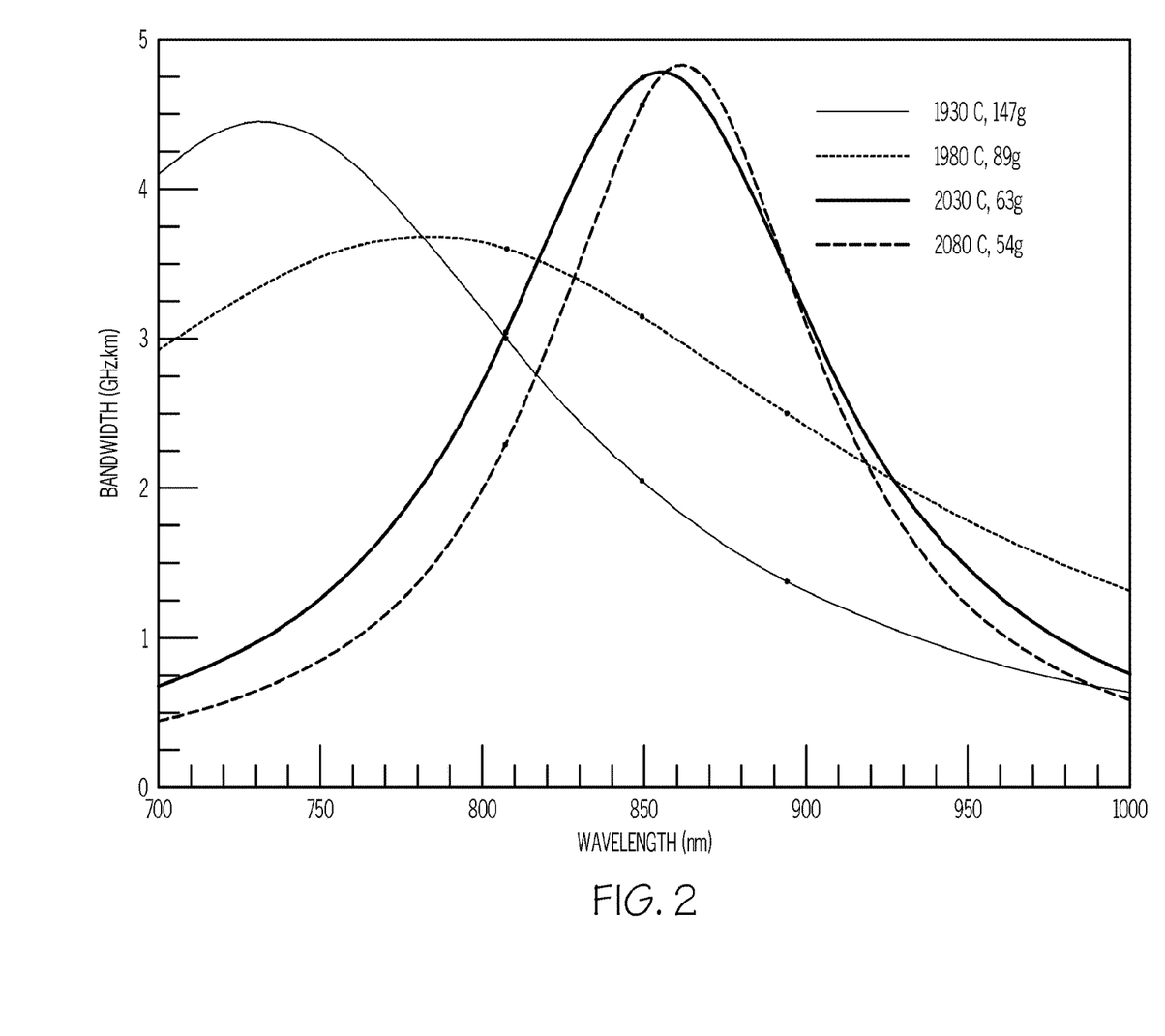
FIG. 2 schematically depicts bandwidth functions determined from measured bandwidth-wavelength pairs for four multi-mode optical fibers according to one or more embodiments shown and described herein.

The measured peak wavelength of each of the four drawn multi-mode optical fibers was determined by the multi-mode optical fiber peak wavelength determination system 160. Specifically, light emitted at a plurality of wavelengths (807 nm, 850 nm, and 894 nm) was coupled into each of the multi-mode optical fibers and a bandwidth of each fiber was determined at each wavelength. From the bandwidth-wavelength pairs for each of the four fibers, four separate bandwidth functions were determined that fit the bandwidth-wavelength pairs, as illustrated in FIG. 2. The measured peak wavelength of each of the four fibers was determined as the wavelength that maximized the corresponding bandwidth function illustrated in FIG. 2. The measured peak wavelength of the fiber drawn at 147 g was determined to be 731.9 nm. The measured peak wavelength of the fiber drawn at 89 g was determined to be 782.49 nm. The measured peak wavelength for the fiber drawn at 63 g was determined to be 854.95 nm. The measured peak wavelength for the fiber drawn at 54 g was determined to be 861.6 nm.

Figure 3:
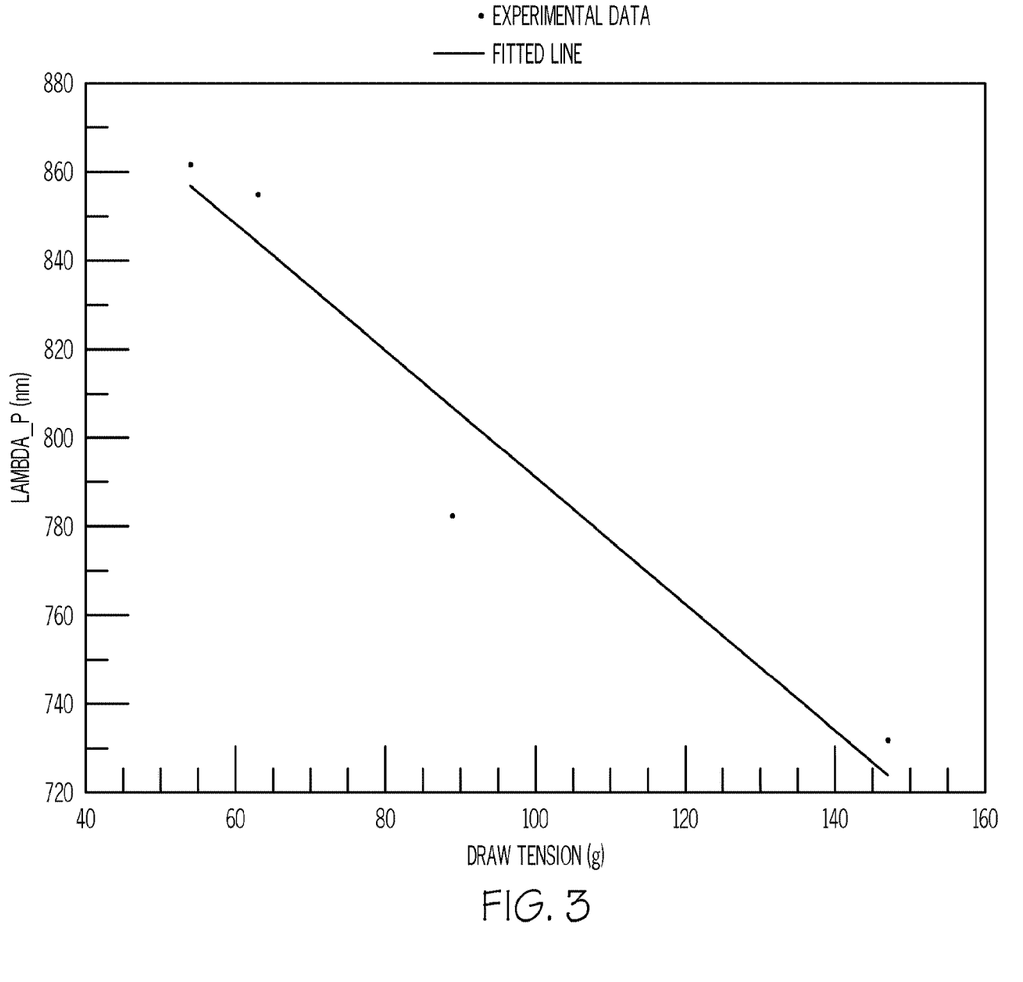
FIG. 3 schematically depicts a function defining the relationship between drawing tension and peak wavelength according to one or more embodiments shown and described herein.

Once the measured peak wavelength of each of the four fibers was determined, a function defining the relationship between drawing tension and peak wavelength was established by fitting the measured peak wavelength and drawing tension data for each of the four fibers, as illustrated in FIG. 3. For example, the fitted line of FIG. 3 may be described by the equation $\lambda_p = c*T_g + d$, where $T_g$ is a drawing tension and $\lambda_p$ is the peak wavelength, c is about −1.43, and d is about 33.69. While the peak wavelength to tension relationship depicted in FIG. 3 is a fitted line, it should be understood that in other embodiments, the relationship between the peak wavelength and drawing tension may not be a linear function, such as in embodiments in which the peak wavelength and drawing tension are related by a non-linear function or a look-up table. Furthermore, it should be understood that a function or relationship may be defined to relate peak wavelength to the temperature of the drawing furnace or any other process parameter that directly or indirectly influences drawing tension. Moreover, it should be understood that the particular relationship between drawing tension and peak wavelength may vary based on characteristics of the preform, the components of the drawing system, ambient conditions, drawing process parameters, and the like, but the particular relationship between drawing tension and peak wavelength may be determined in the manner described hereinabove for any set of conditions.

Once a relationship was established between the drawing tension and the peak wavelength (in this particular case $\lambda_p = -1.43*T_g + d$), the measured peak wavelength of a test segment of drawn fiber was determined, a difference between the target peak wavelength and the measured peak wavelength of the test segment was determined, and the process for manufacturing multi-mode optical fiber was modified based on the difference between the target peak wavelength and the measured peak wavelength by modifying the drawing tension based on the relationship between the drawing tension and the peak wavelength. Specifically, a sample of fiber was drawn and separated for coupling to the multi-mode optical fiber peak wavelength determination system 160. The peak wavelength of the sample fiber was determined by the multi-mode optical fiber peak wavelength determination system 160 to be 820 nm. The target peak wavelength for the fiber was 850 nm. Thus, the difference between the target peak wavelength of the test segment and the measured peak wavelength ($\Delta\lambda_p$) is 30 nm, corresponding to a 21 g decrease in drawing tension to achieve the target peak wavelength of 850 nm ($\Delta\lambda_p = -1.43 * \Delta T_g$). The process for manufacturing the multi-mode optical fiber was modified by increasing the temperature of the draw furnace to an amount sufficient to decrease the drawing tension by 21 g while maintaining the same draw speed, fiber diameter. In other embodiments, the tension may be adjusted by adjusting one or more parameters of the fiber take-up system 140. Furthermore, it should be understood that the drawing tension may be adjusted by the process controller 150 receiving a desired tension set-point input by a user of control software, which may cause the process controller 150 to alter fiber manufacturing parameters in order to achieve the desired tension set-point.

Example 2

In another example, a number of optical fibers were drawn to have peak wavelengths at several target peak wavelengths. The modal bandwidth of each of the fibers was measured using a ModCon multimode fiber conditioner, commercially available from Ardent, which creates a typical multimode fiber launch condition as typically seen in VCSEL-based laser sources. To evaluate the ability to achieve various target peak wavelengths, drawing tensions were adjusted based on a function that defines the relationship between the change in drawing tension and the change in peak wavelength. The function defining the relationship between the change in drawing tension and change in peak wavelength may be any of the functions described above, or any other mathematical or empirical relation that maps target peak wavelength to drawing tension. The peak wavelength of each of the fibers was then measured to determine how close the measured peak wavelength was to the target peak wavelength. Specifically, a first fiber was drawn at a tension of 125 g. The peak wavelength of the first fiber was measured to be 852 nm. The peak bandwidth of the first fiber was 8.82 GHz*km and the bandwidth of the first fiber at 850 nm was 8.79 GHz*km. A second fiber was drawn from the same preform as the first fiber at a tension of 155 g, which was the drawing tension determined to correspond to a target peak wavelength of 809 nm based on the function. The peak wavelength of the second fiber was measured to be 816 nm, which is within 7 nm of the 809 nm target peak wavelength. The peak bandwidth of the second fiber was 7.51 GHz*km and the bandwidth of the second fiber at 850 nm was 3.95 GHz*km. Subsequently, a third fiber was drawn from the same preform at a tension of 136 g, which was the drawing tension determined to correspond to a target peak wavelength of 837 nm based on the function. The peak wavelength of the third fiber was measured to be 837 nm, which is the same as the target peak wavelength. The peak bandwidth of the third fiber was 7.46 GHz*km and the bandwidth of the third fiber at 850 nm was 6.83 GHz*km.

Example 3

In another example using another preform, a fiber was drawn at a specified drawing tension of 147 g. After 20 km of the fiber was drawn, a first 1 km fiber sample was taken and the peak wavelength was measured to be 848 nm with peak bandwidth of 7.18 GHz*km and bandwidth at 850 nm to be 7.16 GHz*km. The draw tension was reduced by 17 g tension (to 130 g), resulting in a target peak wavelength of 873 nm. The peak wavelength of the fiber was measured to be 871 nm for a second 1 km sample after the adjustment in the tension. The measured peak wavelength of 871 nm is within 2 nm of the target peak wavelength, demonstrating the ability to tightly control peak wavelength. The peak bandwidth of the second fiber sample was 8.13 GHz*km with a bandwidth at 850 nm of 6.62 GHz*km. The draw tension was then increased by 14 g (to 144 g), resulting in a target peak wavelength of 850 nm. After waiting a few minutes to allow the tension to stabilize, a third 1 km sample fiber was taken, the peak wavelength of which was measured to be 850 nm. The fact that the measured peak wavelength of the third fiber was the same as the target peak wavelength further demonstrates the ability to tightly control peak wavelength in manufactured multi-mode optical fiber.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for manufacturing a multi-mode optical fiber, the method comprising:
   measuring at least one characteristic of a multi-mode optical fiber under test as the multi-mode optical fiber under test is drawn from a multi-mode optical fiber preform, wherein the at least one characteristic is a modal bandwidth or a differential mode delay at one or more wavelengths;
   determining a measured peak wavelength of the multi-mode optical fiber under test based on the measured characteristic;
   determining a difference between a target peak wavelength and the measured peak wavelength; and
   while drawing the multi-mode optical fiber under test from the multi-mode optical fiber preform, adjusting at least one drawing process parameter based on the difference between the target peak wavelength and the measured peak wavelength to produce the multi-mode optical fiber.

2. The method of claim 1, wherein the at least one characteristic is the modal bandwidth and the method further comprises:
   coupling light emitted at a plurality of wavelengths from at least one light source into the multi-mode optical fiber under test,
   determining a plurality of corresponding bandwidths for light emitted at the plurality of wavelengths, wherein each wavelength is associated with a corresponding bandwidth; and
   determining a bandwidth function that fits the plurality of wavelengths and the plurality of corresponding bandwidths, wherein the measured peak wavelength maximizes the bandwidth function.

3. The method of claim 1, wherein the at least one drawing process parameter includes a temperature of a drawing furnace, a drawing speed of the multi-mode optical fiber under test, or a mechanically applied drawing tension of the multi-mode optical fiber under test.

4. The method of claim 1, wherein adjusting at least one drawing process parameter further comprises adjusting a drawing tension as a function of the difference between the target peak wavelength and the measured peak wavelength.

5. The method of claim 4, wherein the drawing tension is adjusted according to the following equation: $\Delta\lambda_p = c * \Delta T_g$, wherein $\Delta T_g$ is a drawing tension adjustment amount from a previous drawing tension, $\Delta\lambda_p$ is the resulting difference of peak wavelength between the target peak wavelength and the measured peak wavelength, and c is a variable.

6. The method of claim 1, wherein the at least one drawing process parameter is adjusted when the difference between the target peak wavelength and the measured peak wavelength exceeds a threshold.

7. The method of claim 1, further comprising halting the manufacturing of the multi-mode optical fiber and restarting the manufacturing of the multi-mode optical fiber after the adjusting at least one drawing process parameter.

8. The method of claim 1, wherein the multi-mode optical fiber preform is a first preform formed from a first cane of a core blank, the method further comprising:
drawing an additional multi-mode optical fiber from a second preform formed from a second cane of the core blank after adjusting the at least one drawing process parameter.

9. The method of claim 1, wherein the target peak wavelength is between 780 nm and 1650 nm.

10. A method for manufacturing a multi-mode optical fiber, the method comprising:
coupling light emitted from at least one light source at a plurality of wavelengths into a multi-mode optical fiber under test as the multi-mode optical fiber under test is drawn from a multi-mode optical fiber preform;
determining a plurality of corresponding bandwidths for light emitted at the plurality of wavelengths, wherein each wavelength is associated with a corresponding bandwidth;
determining a bandwidth function that fits the plurality of wavelengths and the plurality of corresponding bandwidths;
determining a measured peak wavelength of the multi-mode optical fiber under test based on the bandwidth function, wherein the measured peak wavelength maximizes the bandwidth function;
determining a difference between a target peak wavelength and the measured peak wavelength; and
while drawing the multi-mode optical fiber under test from the multi-mode optical fiber preform, adjusting an at least one drawing process parameter of the multi-mode optical fiber under test based on the difference between the target peak wavelength and the measured peak wavelength to produce the multi-mode optical fiber.

11. The method of claim 10, wherein the at least one drawing process parameter includes a temperature of a drawing furnace, a drawing speed of the multi-mode optical fiber under test, or a mechanically applied drawing tension of the multi-mode optical fiber under test.

12. The method of claim 10, wherein adjusting at least one drawing process parameter further comprises adjusting a drawing tension as a function of the difference between the target peak wavelength and the measured peak wavelength.

13. The method of claim 10, wherein the drawing tension is adjusted according to the following equation: $\Delta\lambda_p = c^* \Delta T_g$, wherein $\Delta T_g$ is a drawing tension adjustment amount from a previous drawing tension, $\Delta\lambda_p$ is the resulting difference of peak wavelength between the target peak wavelength and the measured peak wavelength, and c is a variable.

14. The method of claim 10, wherein the at least one drawing process parameter is adjusted when the difference between the target peak wavelength and the measured peak wavelength exceeds a threshold.

15. The method of claim 10, wherein the multi-mode optical fiber preform is a first preform formed from a first cane of a core blank, the method further comprising:
drawing an additional multi-mode optical fiber from a second preform formed from a second cane of the core blank after adjusting the at least one drawing process parameter.

* * * * *